US009482325B2

(12) United States Patent
Drennen et al.

(10) Patent No.: US 9,482,325 B2
(45) Date of Patent: Nov. 1, 2016

(54) SYSTEMS AND METHODS FOR LOAD CELL AND MULTI-ROW THRUST BEARING INTEGRATION WITH BALL SCREW AND ACTUATOR DRIVE UNIT HOUSING

(71) Applicant: Goodrich Corporation, Charlotte, NC (US)

(72) Inventors: David Drennen, Bellbrook, OH (US); Harald Klode, Centerville, OH (US); Kevin Rehfus, Troy, OH (US)

(73) Assignee: GOODRICH CORPORATION, Charlotte, NC (US)

( * ) Notice: Subject to any disclaimer, the term of this patent is extended or adjusted under 35 U.S.C. 154(b) by 524 days.

(21) Appl. No.: 13/935,093

(22) Filed: Jul. 3, 2013

(65) Prior Publication Data
US 2015/0007675 A1 Jan. 8, 2015

(51) Int. Cl.
*F16H 25/22* (2006.01)
*B60T 13/74* (2006.01)
*F16D 55/226* (2006.01)
*F16D 65/18* (2006.01)
*B64C 25/42* (2006.01)
*F16D 121/24* (2012.01)
*F16D 125/36* (2012.01)
*F16D 125/40* (2012.01)
*F16D 125/50* (2012.01)

(52) U.S. Cl.
CPC ......... *F16H 25/2204* (2013.01); *B60T 13/741* (2013.01); *F16D 55/226* (2013.01); *F16D 65/18* (2013.01); *B64C 25/42* (2013.01); *F16D 2121/24* (2013.01); *F16D 2125/36* (2013.01); *F16D 2125/40* (2013.01); *F16D 2125/50* (2013.01); *Y10T 74/18576* (2015.01)

(58) Field of Classification Search
CPC . B64C 25/42; B60T 13/741; F16D 2125/36; F16D 2125/40; F16D 55/226; F16D 2121/24; F16D 65/18; F16D 2125/50; Y10T 74/18576; F16H 25/2204
See application file for complete search history.

(56) References Cited

U.S. PATENT DOCUMENTS

| 2,869,385 | A | * | 1/1959 | Geyer | B64C 13/00 244/99.2 |
| 3,011,359 | A | * | 12/1961 | Morrell | F16K 31/522 251/228 |
| 6,378,646 | B1 | * | 4/2002 | Bugosh | B62D 5/0427 180/444 |
| 6,446,519 | B1 | * | 9/2002 | Biester | G05G 15/00 251/129.11 |

(Continued)

FOREIGN PATENT DOCUMENTS

WO 8903490 4/1989

OTHER PUBLICATIONS

Extended European Search Report dated May 10, 2016 in European Application No. 14169590.8.

*Primary Examiner* — David M Fenstermacher
(74) *Attorney, Agent, or Firm* — Snell & Wilmer L.L.P.

(57) ABSTRACT

An electromechanical actuator ("EMA") comprising an actuator drive unit ("ADU") housing and a ball screw is disclosed. The ball screw and ADU housing may interface to form a multi-row thrust bearing (MRTB). Further, the ball screw may be situated at least partially about the ADU housing, an outer surface of the ADU housing may include a first ADU raceway, and an inner surface of the ball screw may include a second inner ball screw raceway. Either or both raceways may comprise hemispherical structures. Further, the first raceway and the second raceway may interface to form a multi-row thrust bearing ("MRTB").

20 Claims, 5 Drawing Sheets

(56) References Cited

U.S. PATENT DOCUMENTS

| | | | | |
|---|---|---|---|---|
| 6,702,060 B2* | 3/2004 | Tatewaki | ............. | B62D 5/0424 |
| | | | | 180/444 |
| 8,020,462 B2* | 9/2011 | Kobayashi | .......... | F16H 25/2204 |
| | | | | 74/424.81 |
| 8,132,477 B2* | 3/2012 | Shirai | ................ | F16H 25/2214 |
| | | | | 74/424.82 |
| 8,863,598 B2* | 10/2014 | Asakura | ............... | B62D 5/0448 |
| | | | | 74/388 PS |
| 8,875,851 B2* | 11/2014 | Winkler | .................. | F16D 65/18 |
| | | | | 188/106 F |
| 8,950,282 B2* | 2/2015 | Babinski | ................. | B23P 15/00 |
| | | | | 74/424.82 |
| 2003/0188948 A1 | 10/2003 | Krzesicki | | |
| 2005/0034936 A1 | 2/2005 | Drennen et al. | | |

* cited by examiner

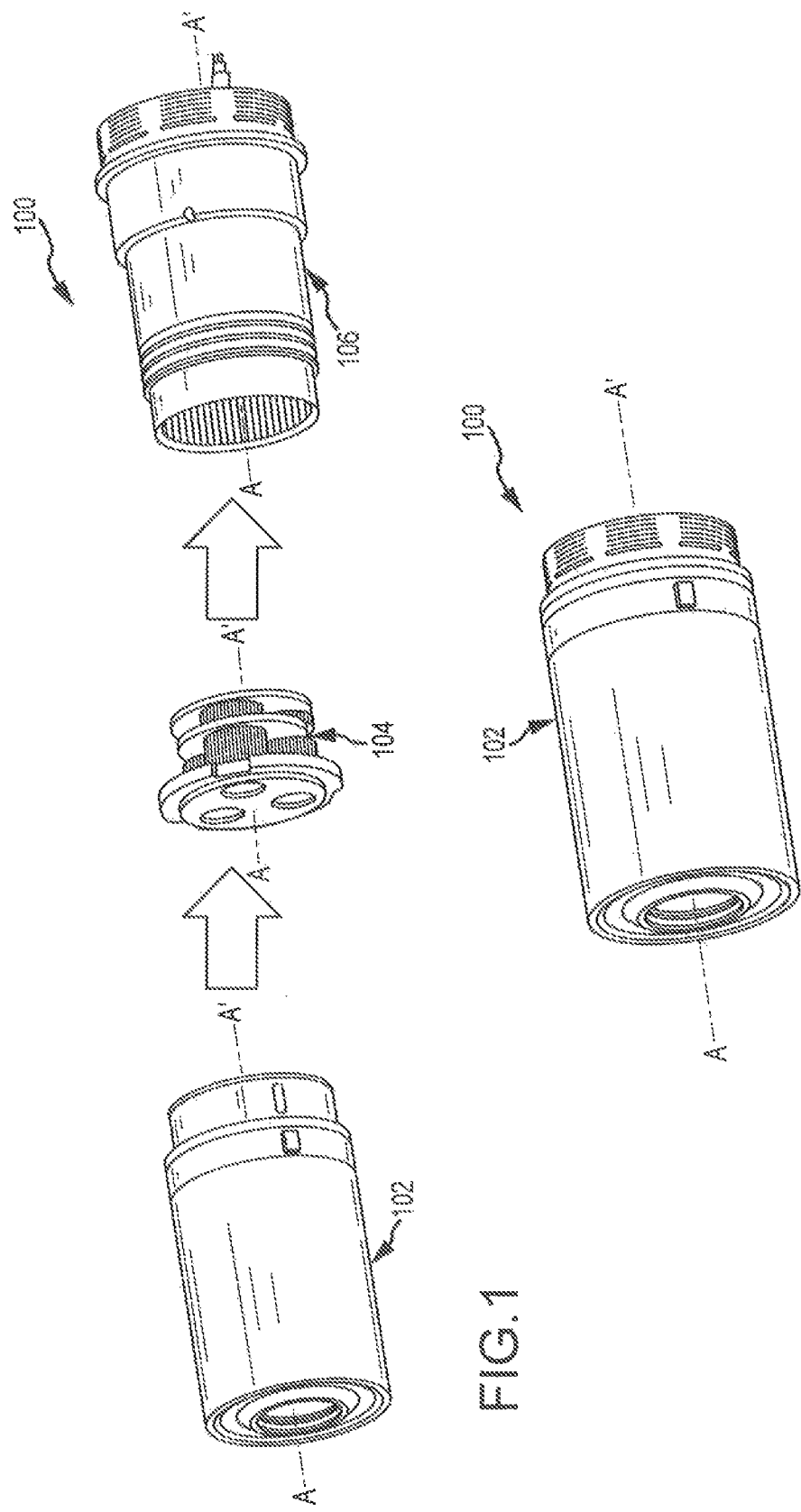

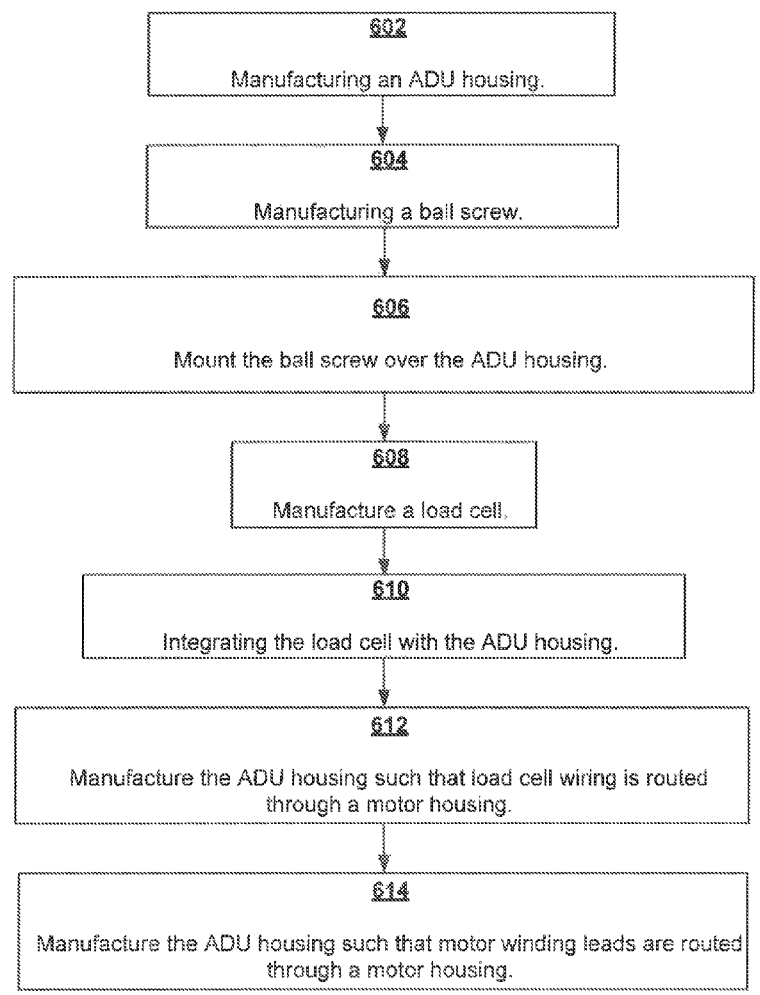

SYSTEMS AND METHODS FOR LOAD CELL AND MULTI-ROW THRUST BEARING INTEGRATION WITH BALL SCREW AND ACTUATOR DRIVE UNIT HOUSING

FIELD

The present disclosure relates to electromechanical actuators ("EMAs"), and more particularly, to EMAs comprising load cells and multi-row thrust bearings ("MRTBs") integrated with actuator drive unit ("ADU") housings.

BACKGROUND

EMAs comprise systems capable of moving a moveable member, such as ram or "puck." A ram may be positioned to forcefully engage one or more components of a brake disk stack, for example, generating braking force. Thus, EMAs may be found in various braking systems, including for example brakes used with aircraft wheels.

An EMA may comprise an actuator drive unit ("ADU"). The ADU may itself comprise a motor and a motor housing (also referred to as an ADU housing). The motor may cause a ball screw to rotate about the ADU housing.

A separate support structure may support rotation of the ball screw about the ADU housing. A plurality of ball bearings may circulate within the support structure to facilitate rotation of the ball screw about the ADU housing. Thus, a ball screw may be referred to as a "rotating race," while an ADU housing may be referred to as a "static race."

As the ball screw rotates on the support structure over the ADU housing, a cylindrical ball nut situated over an outer surface of the ball screw may translate in an axial direction over a separate plurality of balls circulating within a raceway or channel formed between the ball screw and the ball nut. Thus, the ball nut may translate axially over the ball screw, as the ball screw rotates. As the ball nut advances, the ram or puck, which may be coupled to the ball nut, may apply a braking force.

SUMMARY

An EMA comprising an actuator drive unit ("ADU") housing and a ball screw is disclosed. In various embodiments, the ball screw and ADU housing may interface to form a multi-row thrust bearing (MRTB). Further, in various embodiments, the ball screw may be situated at least partially about the ADU housing. An outer surface of the ADU housing may include an ADU raceway, and an inner surface of the ball screw may include a ball screw raceway. The ADU raceway and/or the inner ball screw raceway may comprise hemispherical structures. Further, in various embodiments, the ADU raceway and the inner ball screw raceway may interface to form a multi-row thrust bearing ("MRTB"). In various embodiments, the EMA may comprise a plurality of load cells integrated with the ADU housing. Moreover, in various embodiments, the forces generated by the EMA may act along a single axis. Load cell wiring and/or motor winding leads may be routed through a motor housing.

A ball screw is further disclosed. The ball screw may in various embodiments comprise a cylindrical member comprising an outer surface and an inner surface and/or an inner ball screw raceway disposed on the inner surface. The inner ball screw raceway may interface with an actuator drive unit ("ADU") raceway disposed on an outer surface of the ADU housing. The ball screw may be situated at least partially about the ADU housing. In various embodiments, the inner ball screw raceway and the ADU raceway interface to form a multi-row thrust bearing (MRTB). The MRTB may reduce and/or eliminate race creep (e.g., of the static race).

An ADU housing is further disclosed. The ADU housing may comprise a cylindrical member comprising an outer surface and an inner surface and/or an ADU raceway disposed on the outer surface. Further, in various embodiments, the ADU raceway may interface with an inner ball screw raceway disposed on an inner surface of the ball screw. In addition, the ADU housing may be situated at least partially within a ball screw. Further, the inner ball screw raceway and the ADU raceway may interface to form a multi-row thrust bearing (MRTB), and a plurality of load cells may be integrated with the ADU housing.

BRIEF DESCRIPTION OF THE DRAWINGS

The subject matter of the present disclosure is particularly pointed out and distinctly claimed in the concluding portion of the specification. A more complete understanding of the present disclosure, however, may best be obtained by referring to the detailed description and claims when considered in connection with the drawing figures, wherein like numerals denote like elements.

FIG. 1 illustrates, in accordance with various embodiments, an exploded view of an electromechanical actuator.

FIG. 2 illustrates, in accordance with various embodiments, a perspective view of an electromechanical actuator.

FIG. 6 illustrates, in accordance with various embodiments, a process for manufacturing an electromechanical actuator.

DETAILED DESCRIPTION

Figure 3:
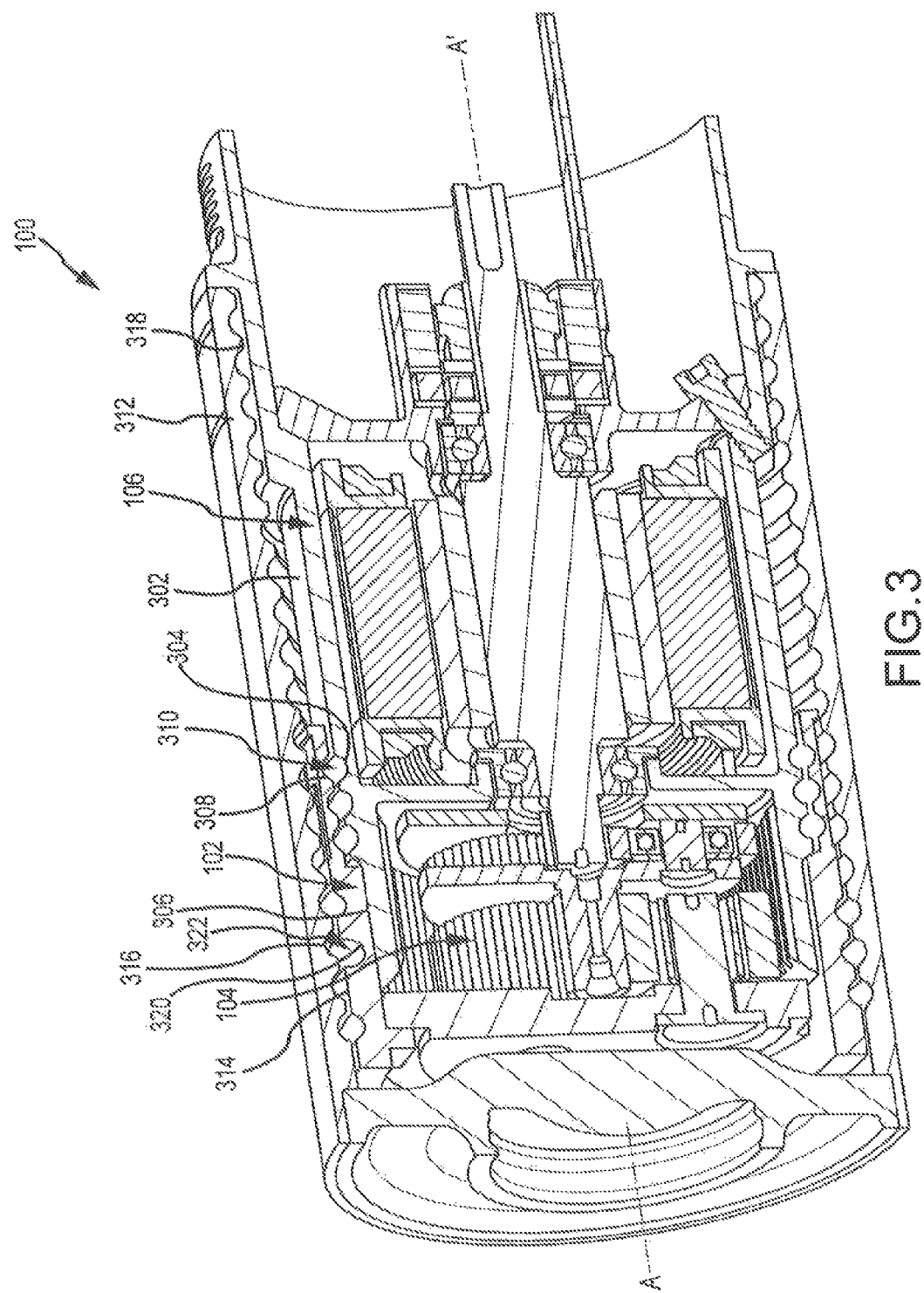
FIG. 3 illustrates, in accordance with various embodiments, a cross-sectional view of an electromechanical actuator.

The detailed description of exemplary embodiments herein makes reference to the accompanying drawings, which show exemplary embodiments by way of illustration and their best mode. While these exemplary embodiments are described in sufficient detail to enable those skilled in the art to practice the inventions, it should be understood that other embodiments may be realized and that logical, chemical and mechanical changes may be made without departing from the spirit and scope of the inventions. Thus, the detailed description herein is presented for purposes of illustration only and not of limitation. For example, the steps recited in any of the method or process descriptions may be executed in any order and are not necessarily limited to the order presented. Furthermore, any reference to singular includes plural embodiments, and any reference to more than one component or step may include a singular embodiment or step. Also, any reference to attached, fixed, connected or the like may include permanent, removable, temporary, partial, full and/or any other possible attachment option. Additionally, any reference to without contact (or similar phrases) may also include reduced contact or minimal contact.

In various embodiments, an electromechanical actuator ("EMA") is disclosed. The EMA may be capable of generating a braking force for braking a vehicle wheel, such as an aircraft wheel.

In various embodiments, an EMA may comprise an actuator drive unit ("ADU"). The ADU may comprise a motor and a motor housing situated about the motor. The motor housing may be referred to as an "ADU housing." A ball screw may be mounted over the ADU housing. An outer surface of the ADU housing may include a hemispherical channel or "raceway" (or "ADU raceway") situated concentrically about a portion of the circumference of the ADU housing. Similarly, an inner surface of the ball screw may include a hemispherical channel or raceway (or "inner ball screw raceway") situated concentrically about a portion of the circumference of the ball screw. The inner ball screw raceway, may interface with the ADU raceway to form a cylindrical, or other shaped channel. For example, in various embodiments, the channel may comprise a substantially spherical and/or hemispherical channel, such as a gothic arch shape and/or a pair of gothic arch shapes. This channel may function as a multi-row thrust bearing (or "MRTB").

In operation, the ball screw may rotate about the ADU housing on a plurality of ball bearings disposed within the MRTB. Thus, the ball screw may be referred to as a "rotating race," while the ADU housing may be referred to as a "stationary race."

A cylindrical ball nut may, in addition, be disposed about an outer surface of the ball screw. The ball nut may include a hemispherical or other shaped raceway formed about its inner surface (the "ball nut raceway"), which may, together with a hemispherical or other shaped raceway formed about the outer surface of the ball screw (the "outer ball screw raceway") form a cylindrical or other shaped groove or channel between the ball screw and the ball nut. A plurality of ball bearings may circulate within this channel, and as the ball screw rotates about the ADU housing on the MRTB, the ball bearings circulating over the outer ball screw raceway may cause the ball nut to translate axially over the outer surface of the ball screw. Thus, the ball nut may be translated in an axial direction to apply a pressure to an object coupled to an end of the ball nut (e.g., a brake pad).

Further, in various embodiments, the components described herein (e.g., the MRTB) may be manufactured by a single party or manufacturer, such that the various components and assemblies may be referred to as "integrated." The integrated components and assemblies may fit closely together and may be configured in a variety of unique ways giving rise, as described below, to a variety of advantages.

In various embodiments, and with reference to FIGS. 1 and 2, an electromechanical actuator ("EMA") 100 comprising a ball screw 102, a gear train 104, and an actuator drive unit ("ADU") housing 106 are shown. The ball screw 102, the gear train 104, and the ADU housing 106 may extend along an axis marked A-A'. The point near A may be referred to as proximal and the point near A' may be referred to as distal.

As described above, the gear train 104 and ADU housing 106 may be mounted within the ball screw 102, and a motor coupled to the gear train 104 may cause the ball screw 102 to rotate circumferentially as a plurality of ball bearings circulate through a multi-row thrust bearing ("MRTB"). Circumferential rotation of the ball screw 102 may cause a ball nut disposed about or enclosing at least a portion of an outer surface of the ball screw 102 to translate axially over the ball screw 102 substantially along the line A-A'.

More particularly, and with reference to FIG. 3, a cross-sectional view of an assembled EMA 100 is shown. As described above, an outer surface 302 of the ADU housing 106 may include a first hemispherical channel or "raceway" 304 (or "ADU raceway") situated concentrically about a portion of the outer surface 302 of the ADU housing 106. Similarly, an inner surface 306 of the ball screw 102 may include a second hemispherical channel or raceway 308 (or "inner ball screw raceway") situated concentrically about a portion of the inner surface 306 of the ball screw 102. The second or inner ball screw raceway 308 may interface with the first or ADU raceway 304 to form a cylindrical channel comprising a multi-row thrust bearing (or "MRTB") 310.

Therefore, unlike many conventional systems in which an MRTB may comprise a separate EMA component (to be installed separately between a ball screw and ADU housing) in various embodiments, the MRTB 310 may be machined from an ADU housing 106 and a ball screw 102. Thus, the EMA 100 described herein may include an MRTB 310 that is "integral" to an ADU housing 106 and a ball screw 102. In other words, as described herein, the MRTB 310 can be machined from a ball screw 102 and an ADU housing 106, such that a separately constructed and installed MRTB is not required.

In operation, the ball screw 102 may rotate about the ADU housing 106 supported by a plurality of ball bearings disposed within the MRTB 310. Thus, the ball screw 102 may be referred to as a "rotating race," while the ADU housing 106 may be referred to as a "stationary race."

Further, a cylindrical ball nut 312 may be disposed about and/or at least partially enclose an outer surface 314 of the ball screw 102. The ball nut 312 may include a hemispherical raceway 316 formed about its inner surface 318 (the "ball nut raceway"), which may, together with a hemispherical raceway 320 formed about the outer surface 314 of the ball screw 102 (the "outer ball screw raceway") form a cylindrical groove or channel 322 between the ball screw 102 and the ball nut 312. A plurality of ball bearings may circulate within this channel 322, and as the ball screw 102 rotates about the ADU housing 106 on the MRTB 310, the ball bearings circulating over the outer ball screw raceway 320 may cause the ball nut 312 to translate axially over the outer surface 314 of the ball screw 102. Thus, the ball nut 312 may be translated in an axial direction to apply a pressure to an object coupled to an end of the ball nut 312 (e.g., a brake pad). In various embodiments, any of the raceways 304, 308, 316, 320, and/or the MRTB 310 may comprise a helical or substantially helical path. Further, in various embodiments, any of the raceways 304, 308, 316, 320, and/or the MRTB 310 may comprise any other circumferential, axial, and/or combination circumferential and axial path advancing, in either direction, about a circumference of any portion of the EMA 100, the ball nut 312, the ADU housing 106, the ball screw 102, and/or the like.

Figure 4:
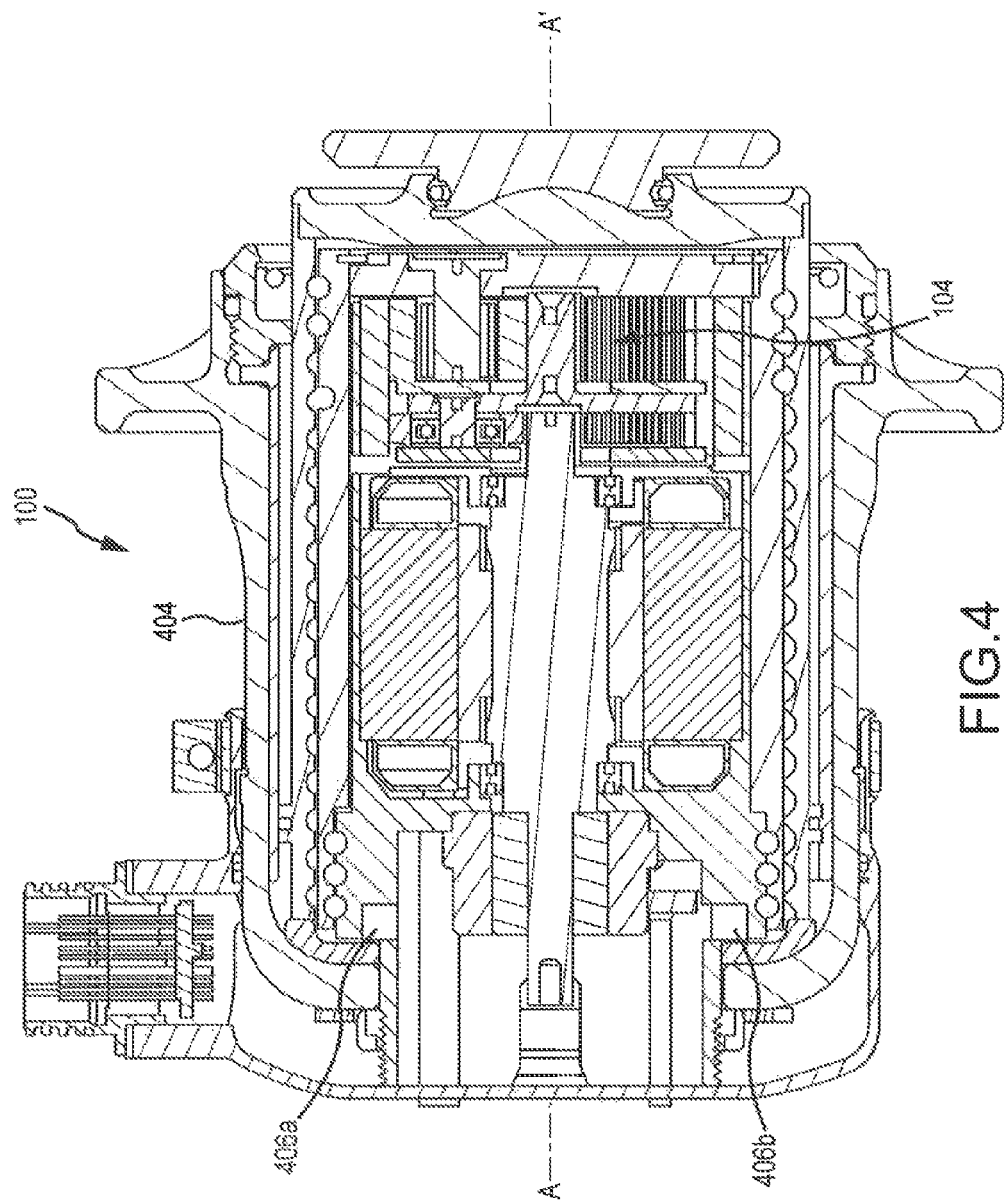
FIG. 4 illustrates, in accordance with various embodiments, a cross-sectional view of an electromechanical actuator coupled to a puck.

Referring to FIG. 4, an assembled EMA 100 is shown. The EMA 100 may comprise an EMA housing 404. The ball screw 102 and ADU housing 106 may be disposed or mounted within the EMA housing 404. Further, in various embodiments, one or more load cells or strain gauges 406a and/or 406b may be contained within and/or integral to the EMA housing 404 and/or the ADU housing 106.

Accordingly, integration of the load cells 406a and/or 406b and/or the MRTB 310 with the ADU housing 106 may, in the various embodiments, improve overall load cell 406a and/or 406b accuracy (e.g., an improvement in the accuracy of the strain or force sensed), because the load cells 406a and/or 406b may be unable to move (or restrained in their movement) relative to the ADU housing 106 and/or the ball screw 102 in response to forces arising as a result of vibration, shock, etc. Such forces may lead to measurement errors and the like.

Integration of the load cells 406a and/or 406b and/or the MRTB 310 with the ADU housing 106 may further reduce part count (as fewer items tend to lead to a reduction in the number of fasteners like nuts, bolts, and washers used in assembly), which may lead to improved reliability and lower overall cost, weight, and simplicity. Similarly, integration of load cells 406a and/or 406b and/or MRTB 310 with the ADU housing 106 may ease assembly of the ADU housing 106, the ball screw 102, the MRTB 310, the load cells, and/or the EMA 100 as a whole. This may reduce assembly complexity and cost as well.

Further, integration of load cells 406a and/or 406b and/or MRTB 310 with the ADU housing 106 may prevent or reduce race creep, a condition in which one race (e.g., a stationary race, as described above) moves or translates undesirably in relation to another race (e.g., a rotating race, as described above). Race creep may, over time, break or damage load cell wiring.

In addition, integration of load cells 406a and/or 406b and/or MRTB 310 with the ADU housing 106 may lead to a more available or spacious envelop for the park brake, resolver, and the like. This may optimize or increase the power density or force produce by the EMA 100.

With additional regard to the power generated by the EMA 100, in various embodiments, the load path provided by the EMA 100 may be such that all or many forces generated within the EMA 100 act along a single axis A-A'. This may permit an increase in the power generated by the EMA 100.

Figure 5:
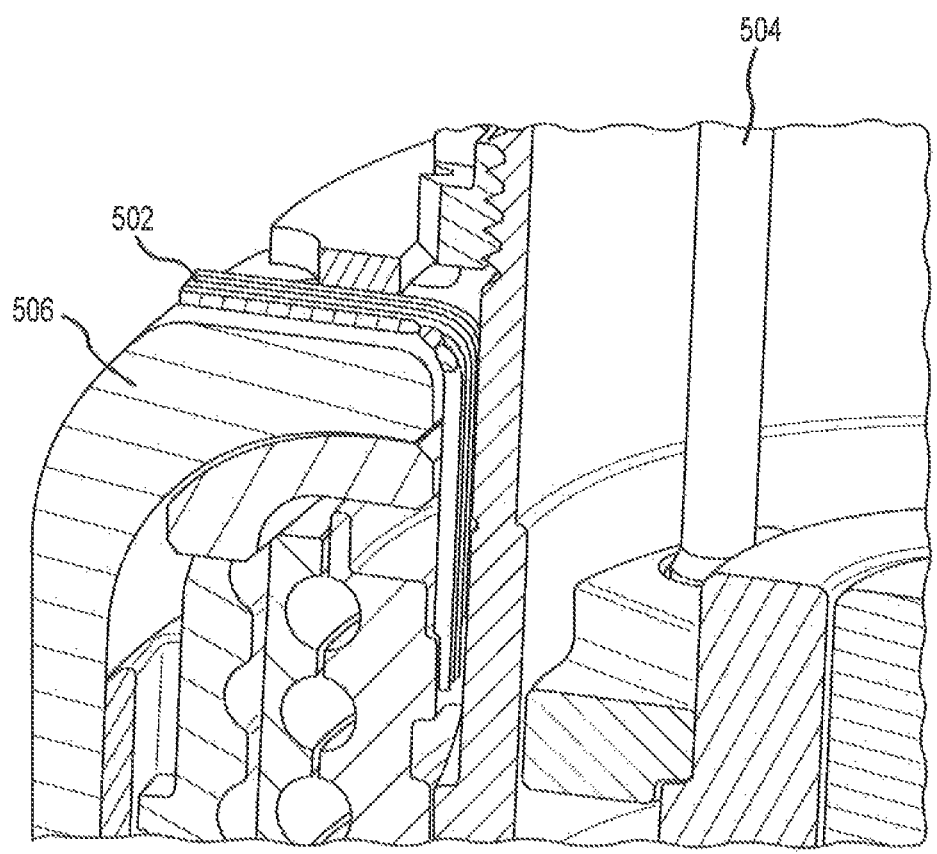
FIG. 5 illustrates, in accordance with various embodiments, a cross-sectional view of a portion of an electromechanical actuator.

In addition, as shown with respect to FIG. 5, integration of the load cells 406a and/or 406b and/or MRTB 310 with the ADU housing 106 may further ease the assembly of the EMA 100, because the load cell wiring 502 may be routed through a channel in the motor housing together with the motor winding leads 504. This may, again, reduce assembly complexity and cost.

Referring to FIG. 6, a method for manufacturing an actuator drive unit is shown. In various embodiments, each step may be performed by an individual party. Thus, it is possible, in various embodiments, to achieve very tight integration and fit between each of the components. In addition, it is possible, in various embodiments, to achieve features which may not be available in conventional systems.

Therefore, in various embodiments, the method may comprise manufacturing an ADU housing 106 (step 602). The method may further comprise manufacturing a ball screw 102 (step 604). In addition, the method may comprise mounting the ball screw 102 over the ADU housing 106, such that a MRTB 310 is formed therebetween (step 606). The method may further comprise manufacturing a load cell 406a and/or 406b (step 608). The method may, in addition, comprise integrating one or more load cells 406a and/or 406b with the ADU housing 106 (step 610). In various embodiments, the method may comprise manufacturing the ADU housing 106 such that load cell wiring 502 is routed through a motor housing 506 (step 612). The process may also comprise manufacturing the ADU housing 106 such that motor winding leads 504 are routed through a motor housing (step 614).

Benefits, other advantages, and solutions to problems have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements of the inventions. The scope of the inventions is accordingly to be limited by nothing other than the appended claims, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C. Different cross-hatching is used throughout the figures to denote different parts but not necessarily to denote the same or different materials.

Systems, methods and apparatus are provided herein. In the detailed description herein, references to "various embodiments", "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described, After reading the description, it will be apparent to one skilled in the relevant art(s) how to implement the disclosure in alternative embodiments.

Furthermore, no element, component, or method step in the present disclosure is intended to be dedicated to the public regardless of whether the element, component, or method step is explicitly recited in the claims. No claim element herein is to be construed under the provisions of 35 U.S.C. 112, sixth paragraph, unless the element is expressly recited using the phrase "means for." As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. An electromechanical actuator comprising:
   an actuator drive unit housing; and
   a ball screw;
   wherein the ball screw and actuator drive unit housing interface to form a multi-row thrust bearing and at least a portion of the ball screw is concentric with and is situated radially outward from the actuator drive unit housing.

2. The electromechanical actuator of claim 1, wherein:
   the actuator drive unit housing comprises a first hemispherical channel extending circumferentially around an outer surface of the actuator drive unit housing;

the ball screw comprises a second hemispherical channel extending circumferentially around an inner surface of the ball screw; and the first hemispherical channel interfaces with the second hemispherical channel to form a multi-row thrust bearing.

3. The electromechanical actuator of claim 1, wherein the first hemispherical channel comprises a first plurality of hemispherical channels and the second hemispherical channel comprises a second plurality of hemispherical channels, wherein the first plurality of hemispherical channels and the second plurality of hemispherical channels interface to form the multi-row thrust bearing.

4. The electromechanical actuator of claim 1, further comprising a plurality of load cells integrated with the actuator drive unit housing.

5. The electromechanical actuator of claim 1, wherein forces generated by the electromechanical actuator act along a single axis.

6. The electromechanical actuator of claim 4, wherein load cell wiring is routed through a motor housing.

7. The electromechanical actuator of claim 6, wherein motor winding leads are routed through a motor housing.

8. A ball screw comprising:
a cylindrical member comprising an outer surface and an inner surface, wherein an inner ball screw raceway extends circumferentially around the inner surface of the cylindrical member; and
an actuator drive unit housing comprising an outer surface, wherein an actuator drive unit raceway extends circumferentially around the outer surface of the actuator drive unit housing;
wherein the actuator drive unit housing is disposed concentric with and radially inward of the cylindrical member and, the inner ball screw raceway directly interfaces with the actuator drive unit raceway to form a multi-row thrust bearing.

9. The ball screw of claim 8, wherein the inner ball screw raceway is integrally formed on the inner surface of the cylindrical member and the actuator drive unit raceway is integrally formed on the outer surface of the actuator drive unit housing.

10. The ball screw of claim 8, wherein the inner ball screw raceway is machined into the inner surface of the cylindrical member and the actuator drive unit raceway is machined into the outer surface of the actuator drive unit housing.

11. The ball screw of claim 8, wherein forces generated by the ball screw act along a single axis.

12. The ball screw housing of claim 8, wherein the multi-row thrust bearing eliminates race creep.

13. An electromechanical actuator comprising:
an actuator drive unit housing;
a cylindrical member concentric with and situated radially outward from the actuator drive unit housing; and
a ball nut concentric with and situated radially outward from both the actuator drive unit housing and the cylindrical member;
wherein ball bearing raceways for relative rotation between the actuator drive unit housing, the cylindrical member, and the ball nut are integrally formed in respective surfaces of the actuator drive unit housing, the cylindrical member, and the ball nut.

14. The electromechanical actuator of claim 13, wherein the ball bearing raceways are machined into the respective surfaces of the actuator drive unit housing, the cylindrical member, and the ball nut.

15. The electromechanical actuator of claim 13, wherein:
an outer surface of the actuator drive unit housing comprises a first hemispherical channel extending circumferentially around the outer surface of the actuator drive unit housing;
an inner surface of the cylindrical member comprises a second hemispherical channel extending circumferentially around the inner surface of the cylindrical member; and
the first hemispherical channel and the second hemispherical channel directly interface to form a multi-row thrust bearing.

16. The electromechanical actuator of claim 15, wherein the ball screw comprises a third hemispherical channel extending helically around an outer surface of the ball screw and the ball nut comprises a fourth hemispherical channel extending helically around an inner surface of the ball nut.

17. The electromechanical actuator of claim 13, wherein a plurality of load cells are integrated with the actuator drive unit housing.

18. The electromechanical actuator of claim 1, wherein the first hemispherical channel is integrally formed in the outer surface of the actuator drive unit housing and the second hemispherical channel is integrally formed in the inner surface of the ball screw.

19. The electromechanical actuator of claim 18, wherein the first hemispherical channel is machined into the outer surface of the actuator drive unit housing and the second hemispherical channel is machined into the inner surface of the ball screw.

20. The electromechanical actuator of claim 1, further comprising a ball nut, wherein:
the ball screw comprises a third hemispherical channel extending helically around an outer surface of the ball screw;
the ball nut comprises a fourth hemispherical channel extending helically around an inner surface of the ball nut;
the third hemispherical channel and the fourth hemispherical channel form a ball bearing raceway configured for relative rotation between the ball screw and the ball nut to effectuate axial translation of the ball nut; and
the ball nut is concentric with and is situated radially outward from both the ball screw and the actuator drive unit housing.

\* \* \* \* \*